Patented Feb. 16, 1954

2,669,571

UNITED STATES PATENT OFFICE 2,669,571

PROCESS FOR THE PREPARATION OF 3,12-DIHYDROXY CHOLENIC ACIDS AND THEIR ESTERS

Temple Clayton, Parsippany, Emanuel B. Hershberg, West Orange, and Bernard F. Schoen, Union City, N. J., assignors to Schering Corporation, Bloomfield, N. J., a corporation of New Jersey No Drawing. Application August 25, 1950, Serial No. 181,568

22 Claims. (Cl. 260—397.1)

The present invention relates to a process for eliminating selenium from unsaturated keto steroid acids and their esters which have been prepared by the action of selenium dioxide or selenious acid on the corresponding saturated keto acids and their esters, and more particularly to the elimination of selenium from unsaturated $\Delta^{9,11}$-12-keto steroid acids and their esters produced by the dehydrogenation of the saturated compounds with selenium dioxide or selenious acid.

While our invention is of general application to the de-contamination of unsaturated steroid ketones prepared with the aid of selenium compounds, it will be described in detail below in connection with the treatment of $\Delta^9$-12-keto-17-steroid acids and their esters preparatory to or simultaneously with the further chemical modification of such steroids, as by reduction, for the preparation of intermediates for the manufacture of cortisone.

In the dehydrogenation of 3-hydroxy 12-keto cholanic acids and their esters (wherein the 3-hydroxyl group is protected in known manner by etherification or esterification, for example by succinylation) with the aid of selenium dioxide or selenious acid, the resulting unsaturated compound has selenium attached thereto so tenaciously that it is difficult to remove it in the usual ways. The presence of the selenium is objectionable not only because it contaminates the product but also because it interferes with subsequent reactions, such as reduction and other chemical processes, and seriously affects the yields of these processes.

Thus in the reactions described in the copending application of Erwin Schwenk, Serial No. 754,278, filed June 12, 1947, now Patent No. 2,581,448, various 3-acyloxy 12-keto cholanic acids, including the nor-, bisnor- and etiocholanic acids, are heated with selenious acid in acetic acid solution to effect dehydrogenation at the 9,11-carbons. The resulting unsaturated keto acids contain a considerable proportion of the selenium originally employed and the same cannot be removed by repeated attempts at purification by re-solution and crystallization. When these products are employed as intermediates for the manufacture of other steroid compounds, such as the $\Delta^{9,11}$-12-hydroxy cholanic acid or its esters, for the manufacture of further intermediates in the preparation of cortisone, the contaminating selenium persists in the product and greatly reduces the yields.

We have found that the contaminating selenium can be removed from the steroid compound by treating a solution of the latter with Raney nickel catalyst. The treatment may be effected by heating the solution with Raney nickel, which binds the selenium, and upon separation of the solution from the catalyst, a product is obtained which is free from selenium and can be subjected to any desired further treatment. To insure the removal of all of the selenium within a reasonably short time, the quantity of nickel employed for the removal of the selenium may be of the order of half the weight of the steroid compound and even more. It is of advantage to employ a quantity of catalyst which is one half to two or more times the weight of the steroid to be reduced. In such case, it is not necessary to separate the nickel containing the selenium until after the reduction. By proceeding in this manner, the reduced product is recovered in a very nearly water-white solution.

Where the steroid is to be subjected to hydrogenation by means of Raney nickel-aluminium alloy in alkali metal hydroxide solution, the elimination of the selenium and hydrogenation of the steroid can take place in one step, and in such case a quantity of alloy much in excess of the weight of the steroid compound, desirably of the order of four times the weight of the latter, is employed. The hydrogenation and simultaneous purification of the 12-keto compound can, however, also be accomplished with activated Raney nickel and molecular hydrogen. Thus the removal of the selenium can be effected while the steroid is being subjected to reduction with either nascent or molecular hydrogen.

The starting steroids can be any of those produced by the process described in the above named application, or they can be any stereoids which have been subjected to dehydrogenation by means of selenium dioxide or selenious acid.

It will be understood that while the removal of the selenium is effected by means of Raney nickel catalyst, the hydrogenation of the purified intermediate can be effected in the presence of other hydrogenation catalysts.

The invention will be further described with the aid of the following examples which are presented for illustrative purposes only.

EXAMPLE I

*Methyl-$\Delta^{9,11}$-3,12-dihydroxy cholenate*

1180 g. methyl $\Delta^{9,11}$-3-hydroxy-12-ketocholenate containing selenium as an impurity was refluxed for 16 hours with 600 g. Raney nickel catalyst in 4 l. methanol. After filtering off the detoxification-catalyst, the solution was diluted to 6 l. with methanol and 900 g. fresh nickel catalyst added and the ester reduced under hydrogen. Hydrogenation proceeded smoothly and hydrogen absorption substantially ceased in 3 hours. After removal of the catalyst by filtration, the product was converted in known manner to the 12-methyl ether (melting at 157° C.) for isolation.

EXAMPLE II

$\Delta^{9,11}$-3,12-dihydroxy cholenic acid

To a solution of 50 g. $\Delta^{9,11}$-3-hydroxy-12-keto cholenic acid in 300 g. sodium hydroxide and 7.0 l. water, 30 g. portions of Raney nickel-aluminium alloy were added at intervals until a total of 210 g. had been added over about 3 hours. The course of the reduction was followed by determining the ultra-violet absorption of the solution between 215 and 280 m$\mu$. The absorption due to the $\alpha,\beta$-unsaturated ketone disappeared gradually as the carbonyl group was reduced. After filtering off the precipitated nickel, the solution was acidified and the reduced acid was collected. Without further purification, it was converted to methyl-3,9-epoxy-11,12-dibromo-cholanate melting at 135–140° C. by the known sequence of reactions (Kendall et al., J. Biol. Chem. 173, 271 (1948), and 164, 569 (1946)).

EXAMPLE III

Methyl-$\Delta^{9,11}$-3,12-dihydroxycholenate 402 g. methyl-$\Delta^{9,11}$-3-hydroxy-12-ketocholenate containing selenium as an impurity were dissolved in 2 l. methanol in a small hydrogenator and to it were added 800 g. activated Raney nickel catalyst, which was worked in with a further 2 l. of methanol. Hydrogen was introduced and absorbed readily and at the end of 90 minutes the reaction was substantially complete. The solution of methyl-$\Delta^{9,11}$-3,12-dihydroxycholenate was converted in the known manner to the 12-methyl ether for isolation.

As already indicated the actual reduction of the purified keto acids or their esters can be accomplished by methods other than by the use of Raney catalysts provided, of course, that the nuclear double bond is not simultaneously reduced. Although the 3-hydroxy group in the above examples is free, it may be replaced by a methoxy, ethoxy, acetoxy, succinoxy or other ether, acyloxy or other radical from which the hydroxyl group can be regenerated with the aid of hydrolysis. Also, as mentioned above, the purification process can be applied to other steroid acids and their esters, including the 17-degradation products of the cholenic acids, which may or may not be nuclearly substituted as disclosed in the above examples.

We claim:

1. Process for the removal of selenium from the selenium-contaminated dehydrogenated product of the reaction of a member of the group consisting of selenium dioxide and selenious acid on a keto steroid, comprising subjecting a solution of such contaminated product to the action of a Raney nickel catalyst until separation of the selenium from said product has been effected.

2. Process for the removal of selenium from the selenium-contaminated dehydrogenation product of the reaction of a member of the group consisting of selenium dioxide and selenious acid on a keto steroid with simultaneous reduction of the keto group, which comprises subjecting a solution of said contaminated steroid to the action of a Raney nickel catalyst and a member of the group comprising molecular and nascent hydrogen until substantially complete hydrogenation of the keto group to the hydroxyl group has been effected.

3. Process for the removal of selenium from the selenium-contaminated dehydrogenated product of the reaction of a member of the group consisting of selenium dioxide and selenious acid on a keto steroid, comprising refluxing a solution of such product in a lower aliphatic alcohol with a Raney nickel catalyst until separation of the selenium from said product has been effected.

4. Process for the removal of selenium from the selenium-contaminated dehydrogenated product of the reaction of a member of the group consisting of selenium dioxide and selenious acid on a keto steroid, comprising refluxing a solution of such product in a lower aliphatic alcohol with approximately half its weight of a Raney nickel catalyst for about 16 hours, and separating the solid matter containing the selenium.

5. Process for removal of selenium from the selenium-contaminated dehydrogenated product of the reaction of a member of the group consisting of selenium dioxide and selenious acid on a compound of the group consisting of 3-hydroxy-12-keto cholanic acids and their esters, comprising subjecting a solution of such product to the action of a Raney nickel catalyst until separation of the selenium from said product has been effected.

6. Process for the reduction of selenium-containing 12-keto steroids to produce the corresponding 12-hydroxy compound free from selenium, which comprises heating a solution of the steroid with Raney nickel catalyst to effect removal of the selenium, and thereafter subjecting the steroid to the action of a reducing agent of the group consisting of nascent hydrogen and molecular hydrogen in the presence of a hydrogenation catalyst.

7. Process for the reduction of selenium-containing 12-keto steroids to produce the corresponding 12-hydroxy compound free from selenium, which comprises heating a solution of the steroid with Raney nickel catalyst to effect removal of the selenium, filtering off the catalyst, and then subjecting the solution to the action of molecular hydrogen in the presence of fresh nickel catalyst.

8. Process according to claim 7 wherein the solvent is a lower aliphatic alcohol.

9. Process for the reduction of selenium-containing 12-keto steroids to produce the corresponding 12-hydroxy compound free from selenium, which comprises reacting a solution of the steroid in an alkali metal hydroxide solution with a Raney nickel-aluminium alloy, and removing the metallic residue after the 12-keto group has been reduced.

10. Process according to claim 9, wherein the reaction solution is acidified after separation of the metallic residue, and the reduced acid isolated.

11. Process for the reduction of selenium-containing methyl $\Delta^{9,11}$-3-hydroxy-12-keto cholenate to selenium-free methyl $\Delta^{9,11}$-3,12-dihydroxy cholenate, comprising heating a solution of the 12-keto compound with a Raney nickel catalyst, separating the solution from the selenium-containing catalyst, and subsequently hydrogenating the 12-keto group to the hydroxyl group.

12. Process according to claim 11, wherein the hydrogenation of the 12-keto group is effected by reaction with hydrogen in the presence of Raney nickel catalyst.

13. Process for the reduction of selenium-containing $\Delta^{9,11}$-3-hydroxy-12-keto cholenic acid to selenium-free $\Delta^{9,11}$-3,12-dihydroxy cholenic acid which comprises heating a solution of the 12-keto compound in an alkali metal hydroxide solution with an excess of Raney nickel-aluminium alloy, and separating the solution of the 3,12-dihydroxy compound from the selenium-containing catalyst.

14. Process according to claim 13, wherein the nickel-aluminium alloy is added in portions.

15. Process according to claim 13, wherein the ratio of nickel-aluminium alloy to the 12-keto compound is of the order of 4 to 1.

16. Process according to claim 1, wherein the weight of nickel catalyst is at least half that of the selenium-containing product.

17. Process according to claim 7, wherein the total amount of nickel catalyst is in excess of the weight of the selenium-containing steroid.

18. Process for the removal of selenium from the selenium - contaminated dehydrogenated product of the reaction of a member of the group consisting of selenium dioxide and selenious acid on methyl 3-hydroxy-12-keto cholanate, comprising subjecting a solution of such product to the action of a Raney nickel catalyst until separation of the selenium from said product has been effected.

19. Process according to claim 2, wherein the quantity of catalyst is approximately twice that of the steroid.

20. Process according to claim 2, wherein the steroid is a member of the group consisting of $\Delta^{9,11}$-3-hydroxy-12-keto-cholenic acids and their esters.

21. Process for the removal of selenium from the selenium - contaminated dehydrogenated product of the reaction of a member of the group consisting of selenium dioxide and selenious acid on steroid compounds, which comprises subjecting a solution of such selenium-contaminated dehydrogenated steroid compound to the action of a Raney nickel catalyst until separation of the selenium from said compound has been effected.

22. Process according to claim 21, wherein the steroid compound contains a reducible carbonyl group, and wherein reduction of the keto group to an alcohol group is effected with hydrogen simultaneously with the removal of the contaminating selenium.

TEMPLE CLAYTON.
EMANUEL B. HERSHBERG.
BERNARD F. SCHOEN.

No references cited.